(12) United States Patent
Kogure et al.

(10) Patent No.: US 7,701,529 B2
(45) Date of Patent: Apr. 20, 2010

(54) HOUSING STRUCTURE FOR LIGHTING EQUIPMENT AND PROCESS FOR PRODUCING THE SAME, AND BACKLIGHT DEVICE USING SAID STRUCTURE

(75) Inventors: Masami Kogure, Chiba (JP); Hiroshi Kawato, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 218 days.

(21) Appl. No.: 11/996,551

(22) PCT Filed: Aug. 11, 2006

(86) PCT No.: PCT/JP2006/315940

§ 371 (c)(1),
(2), (4) Date: Jan. 23, 2008

(87) PCT Pub. No.: WO2007/023697

PCT Pub. Date: Mar. 1, 2007

(65) Prior Publication Data

US 2009/0122216 A1   May 14, 2009

(30) Foreign Application Priority Data

Aug. 24, 2005   (JP) .............................. 2005-243462
Dec. 19, 2005   (JP) .............................. 2005-364963

(51) Int. Cl.
G02F 1/1333   (2006.01)
B60Q 3/04   (2006.01)
H01J 9/00   (2006.01)

(52) U.S. Cl. ........................... 349/58; 362/362; 445/24

(58) Field of Classification Search .................... 349/58; 362/362; 445/24
See application file for complete search history.

(56) References Cited

U.S. PATENT DOCUMENTS 7,283,118 B2   10/2007   Nagatani
2007/0229995 A1*   10/2007   Kawato et al. .............. 359/883

FOREIGN PATENT DOCUMENTS

| JP | 4 362920 | 12/1992 |
|----|----------|---------|
| JP | 3040060 | 5/1997 |
| JP | 2001 215497 | 8/2001 |

(Continued)

Primary Examiner—Mike Qi
(74) Attorney, Agent, or Firm—Oblon, Spivak, McClelland, Maier & Neustadt, L.L.P.

(57) ABSTRACT

The present invention provides a housing structure for a lighting device, including a molded product having a thickness of 1.5 to 3.5 mm produced from a polycarbonate-based resin composition containing 20 to 60% by mass of titanium oxide, and a method of producing a housing structure for a lighting device, including: subjecting a polycarbonate-based resin composition containing 20 to 60% by mass of titanium oxide into a sheet; and subjecting the sheet to vacuum forming or pressing to produce a box-type molded product in which a fixing portion of a terminal of a light source is molded integrally to an inner side portion of the molded product. Also provided are a housing structure for a lighting device, which is lightweight and requires small man-hour for assembling, a method of manufacturing the same, a backlight device using the housing for a lighting device, and a liquid crystal display member.

17 Claims, 7 Drawing Sheets

FOREIGN PATENT DOCUMENTS

| | | |
|---|---|---|
| JP | 2001 216807 | 8/2001 |
| JP | 2002 072204 | 3/2002 |
| JP | 2003 162901 | 6/2003 |
| JP | 2003 234012 | 8/2003 |
| JP | 2004 022352 | 1/2004 |
| JP | 2004 055182 | 2/2004 |
| JP | 2004 079531 | 3/2004 |
| JP | 2004 91567 | 3/2004 |
| JP | 2004 102119 | 4/2004 |
| JP | 2004 127643 | 4/2004 |
| JP | 2004 134281 | 4/2004 |
| JP | 2004 139871 | 5/2004 |
| JP | 2004 186080 | 7/2004 |
| JP | 2004 220981 | 8/2004 |
| JP | 2004 348150 | 12/2004 |
| JP | 2005 071687 | 3/2005 |
| JP | 2005 93435 | 4/2005 |
| JP | 2005 108776 | 4/2005 |
| JP | 2005 157296 | 6/2005 |

* cited by examiner (BOTTOM VIEW)  (VIEW ON ARROW TAKEN ALONG THE LINE B-B)

HOUSING STRUCTURE FOR LIGHTING EQUIPMENT AND PROCESS FOR PRODUCING THE SAME, AND BACKLIGHT DEVICE USING SAID STRUCTURE

TECHNICAL FIELD

The present invention relates to a housing structure for a lighting device, in particular a structure for a backlight device for use in liquid crystal displays, a backlight device, a liquid crystal display member, and a manufacturing method therefor.

BACKGROUND ART

In general, a liquid crystal display is constructed of a backlight device and a liquid crystal panel. The backlight device includes a sheet metal back chassis and a front chassis, a light reflecting plate, a light source support portion, a light source, a light diffusing plate, an optional light conductive plate, and a light source drive circuit such as an inverter. The liquid crystal display has such a structure that the liquid crystal panel is mounted and fixed onto the backlight device. The backlight devices are roughly classified into three types: a directly-below type, a light conductive type, and a tandem type which is a hybrid of the former two. Since high luminance is required for the backlight device for use in a large-screen liquid crystal television out of the above backlight devices, the development of directly-below type and tandem (hybrid) type backlight devices (refer to Patent Document 1) is now vigorously underway.

The directly-below type backlight device of the conventional art includes a flat or wavy light reflecting plate which is formed by a resin foamed product being adhered and laminated onto an aluminum sheet metal substrate, a plurality of light sources, light source supports, a light diffusing plate, a plurality of optical films, and a housing structure composed of sheet metal housings (back chassis and front chassis) (refer to Patent Documents 2 to 4, for example).

The liquid crystal display of the conventional art is constructed by mounting the liquid crystal panel onto the above backlight device.

As for the light reflecting plate in use, a light reflecting plate manufactured by adhering and laminating a resin foamed product onto an aluminum sheet metal substrate in order to retain the warp, deformation, and structure of the reflecting plate, is used. In general, a reflector is manufactured by sheet metal processing such as pressing for forming a wavy form or bending for forming side faces.

As for the light sources, a plurality of light sources are used according to the display screen size of the liquid crystal display and luminance required for the backlight device. Linear or U-shaped cold-cathode tubes (CCFL), point light sources such as optical semiconductor devices (LED), or those which are arranged in a linear or planar form are used.

As for the light source supports, not only sheet metal, but also injection molded products of a thermoplastic resin composition are often used. Particularly, light source supports molded out of a polycarbonate resin composition containing titanium oxide have a light reflection function, and light source supports having a rib structure as well as a light source supporting function are used to improve the torsional stiffness of the light reflecting plate.

The light diffusing plate is generally made of an acrylic resin, a copolymer resin of an acrylic monomer and styrene, a polycarbonate resin, or, nowadays, a resin composition including a transparent resin such as cyclic olefin resin with a light diffusing agent blended therein. The light diffusing plate has a thickness of about 1 to 3 mm and is selected according to the size of a liquid crystal display screen and a lighting device system.

Besides, as the light diffusing plate support frame, a frame having not only light source support portions are used, but also having rib structures obtained by an injection molding a polycarbonate-based resin composition containing titanium oxide are employed.

As for the optical films, optical films having a plurality of functions are laminated. Light diffusing films used to make the surface luminance of a backlight device uniform and prism sheets having a luminance improving function are generally used. A plurality of the light diffusing films and a plurality of the prism sheets are laminated in order to control luminance and luminance uniformity.

Those backlight devices of the conventional art have a large number of parts and a large number of assembly steps.

In addition, sheet metal processing is carried out twice: sheet metal processing for manufacturing a reflector by the processing of a light reflecting plate into a wavy plate and bending for forming side faces; and sheet metal processing for manufacturing a chassis (housing), i.e. a housing structure, thereby taking time and labor and making it impossible to eliminate an increase in the weight of the whole device. In a light reflecting plate including a resin foamed material adhered and laminated onto an aluminum sheet metal substrate, the resin foamed layer easily comes off from the aluminum substrate and displaces during sheet metal processing, thereby making it difficult to carry out the sheet metal processing of a complex shape. The aluminum sheet metal substrate used herein is made of aluminum or aluminum alloy. To impart sheet metal processability to the aluminum, the 52S aluminum material which is generally available at relatively cheap price cannot be used, and an expensive material must be used. Since the sheet metal processing of a complex shape is difficult, light source supports having the functions of: supporting a reinforcing structure for preventing the light reflecting plate from twisting; supporting light sources; supporting reflection portions; and insulating heat generated from the terminals of light source electrodes must be manufactured by injection molding a resin composition separately, mounted and fixed after the light sources are installed on the light reflecting plate to construct a reflector. The thickness of the chassis forming the skeleton of the housing structure in the case of aluminum sheet metal is 1 mm for a display screen size of 22 inches, 1.5 mm for a display screen size of 30 inches, and 2 mm for a display screen size of 40 inches. The fact is also a cause for increase in the weight of the device (refer to Patent Documents 5 and 6, for example).

There is further proposed a sheet metal substrate manufactured by applying a coating composition having light reflection ability to a sheet metal substrate for a light reflecting plate. However, the sheet metal substrate is only used in a light reflecting plate, and a reflector having a structure that the sheet metal substrate serves as a back chassis and/or light source supports is not proposed. Light source supports manufactured by injection molding separately must be used in a light source support portion as described above.

Meanwhile, when a light reflecting plate is formed from a polycarbonate-based thermoplastic resin composition containing titanium oxide and having a light reflecting function without using the aluminum sheet metal substrate, it is difficult to suppress warp and deformation caused by thermal expansion due to a temperature rise by heat from the light sources.

To form a chassis for supporting a liquid crystal panel as required, it is difficult to ensure stiffness (refer to Patent Documents 7 and 8, for example).

Although there are proposed methods of improving the structures of light source electrode terminals which are the sources of heat to increase heat radiation, all of the methods cannot achieve in reducing the number of parts (refer to Patent Documents 9 to 11, for example).

Those backlight devices of the conventional art have a large number of parts and a large number of assembly steps. The backlight devices include a housing structure in which an iron or aluminum sheet metal chassis is installed on the back of a reflector and increase the weight of a liquid crystal display.

The reflecting material of the conventional art is a thin (190 μm) film formed by stretching a polyester and a polypropylene-based material, or a polyester-based foamed sheet (1 mm) formed by super critical fluid foaming, and it is difficult to provide a shape by heat processing while the original properties are maintained. Therefore, the thin film and an aluminum sheet metal are assembled and pressed together whereas the super critical foamed sheet is bent by incision. However, those steps are costly and take a lot of time and labor, and there are differences between shape design values estimated from optical properties and actual measurement values.

[Patent Document 1]
Japanese Patent Application Laid-Open (kokai) No. 2002-72204

[Patent Document 2]
Japanese Patent Application Laid-Open (kokai) No. 2004-22352

[Patent Document 3]
Japanese Patent Application Laid-Open (kokai) No. 2004-127643

[Patent Document 4]
Japanese Patent Application Laid-Open (kokai) No. 2001-215497

[Patent Document 5]
Japanese Patent Application Laid-Open (kokai) No. 2004-55182

[Patent Document 6]
Japanese Patent Application Laid-Open (kokai) No. 2004-139871

[Patent Document 7]
Japanese Patent Application Laid-Open (kokai) No. 2004-102119

[Patent Document 8]
Japanese Patent Application Laid-Open (kokai) No. 2003-162901

[Patent Document 9]
Japanese Patent Application Laid-Open (kokai) No. 2004-134281

[Patent Document 10]
Japanese Patent Application Laid-Open (kokai) No. 2001-216807

[Patent Document 11]
Japanese Patent Application Laid-Open (kokai) No. 2003-234012

DISCLOSURE OF THE INVENTION

It is an object of the present invention to solve the above-mentioned problems to provide a housing structure for a lighting device which has a structure that a reflecting plate for reflecting light from light sources arranged therein in a specific direction is integrated with light sources, support portions composed of optical sheets, and fixing portions, serves as a structure itself, is light in weight, and has a small number of assembly steps, a manufacturing method therefor, a direct below-type or tandem type backlight device including the housing for a lighting device, and a liquid crystal display member including the backlight device.

The inventors of the present invention have conducted intensive studies to attain the above-mentioned object and have found that the above object can be attained by employing a housing for a lighting device which is made of a polycarbonate-based resin composition containing titanium oxide, has a structure that a reflecting plate for reflecting light from light sources arranged therein in a specific direction is integrated with light sources, support portions of optical sheets, and fixing portions, and also serves as a structure itself. The present invention has been accomplished based on this finding.

That is, the present invention provides: (1) a housing structure for a lighting device including a box-like molded product having a thickness of 1.5 to 3.5 mm obtained from a polycarbonate-based resin composition containing 20 to 60% by mass of titanium oxide, in which an inner side portion of the molded product has a fixing portion of a terminal of light source integrally formed thereon; (2) a backlight device manufactured by incorporating a linear or point light source in the housing structure for a lighting device according to Item (1), placing a light diffusing plate above the light source, and further laminating optical films; (3) a liquid crystal display member manufactured by incorporating the linear or point light source in the housing structure for a lighting device according to Item (1), placing a light diffusing plate, an optical film, and a liquid crystal panel above the linear or point light source in the stated order, and attaching a peripheral frame member to the periphery thereof; and (4) a method of manufacturing a housing structure for a lighting device, including the steps of: forming a polycarbonate-based resin composition containing 20 to 60% by mass of titanium oxide into a sheet; and vacuum forming or pressing the sheet to manufacture a box-like molded product having a thickness of 1.5 to 3.5 mm in which a portion for fixing a terminal of a light source is integrally formed on an inner side portion.

DESCRIPTION OF REFERENCE NUMERALS

Figure 1:
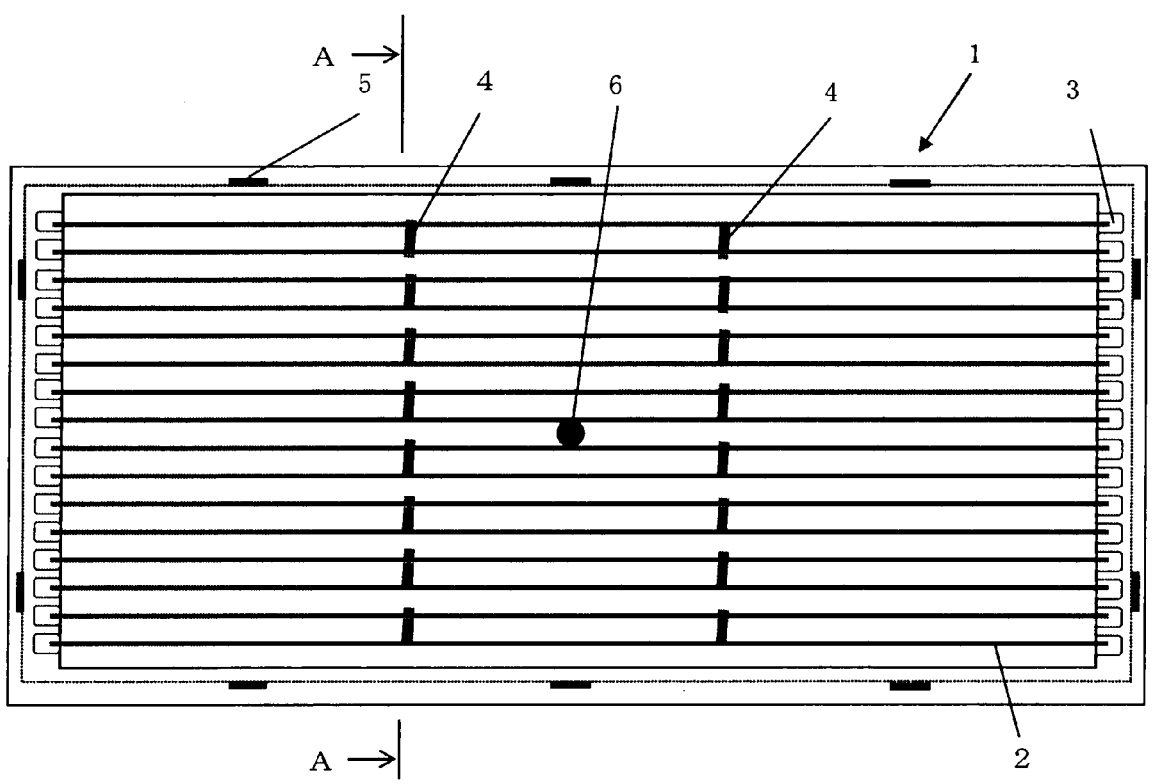
FIG. 1 is a plan view of a backlight showing an example of the housing of the present invention.

1, 10, 20, 30, 40, 50, 60, 70, 80: housing structure for backlight
2: fluorescent tube
3: holding portion of terminal of fluorescent tube (fixing portion)
4: fluorescent tube support portion
5: light diffusing plate fixing portion
6, 61, 62, 63: light diffusing support portion
7, 70: light diffusing plate
8: folded rib
9: flange portion
11: wavy form reflecting portion
12: recessed storage portion
13: substrate for driving liquid crystal
14: liquid crystal panel
15: FPC
16: connector
17: peripheral frame member
18: reinforcing frame
21: light shielding layer
31: screw hole
41: reflecting film

BEST MODE FOR CARRYING OUT THE INVENTION

A housing structure for a lighting device of the present invention is a box-like molded product which has a thickness of 1.5 to 3.5 mm, and is obtained from a polycarbonate-based resin composition containing 20 to 60% by mass of titanium oxide and has fixing portions of the terminals of light sources integrally formed on the inner side portions of the molded product.

In the present invention, linear or U-shaped cold-cathode tubes (CCFL), point light sources such as optical semiconductor devices (LEF), or an array of those light sources which are arranged in a linear or planar form are used in a backlight device, and the term "terminals of light sources" means the holding portions of the electrode terminals of light sources such as linear or U-shaped cold-cathode tubes (CCFL), more specifically fluorescent tubes.

In the present invention, the expression "fixing portions (holding portions) of terminals of light sources integrally formed" means that depressions or projections required for fixing the terminals of light sources are molded simultaneously with the molding of the whole structure.

The titanium oxide used in the present invention is used in the form of a fine powder to provide high reflectance and low transparency, that is, high light shielding properties to a polycarbonate-based polymer mixture. Fine powder titanium oxide having various grain sizes can be manufactured by a chlorine method or sulfuric acid method. The titanium oxide used in the present invention may be of a rutile type or anatase type, preferably rutile type from the viewpoints of heat stability and weatherability. The shape of the fine powder particle of the titanium oxide is not particularly limited and suitably selected from scaly, spherical, and indeterminate shapes.

This titanium oxide is preferably surface treated with a hydrous oxide of aluminum and/or silicon, an amine compound, or a polyol compound. By carrying out this surface treatment, the uniform dispersibility and dispersion stability in a polycarbonate resin composition of the titanium oxide are improved and the compatibility with a flame retardant which is optionally added to the titanium oxide is improved, which is preferred for the manufacture of a homogeneous composition. Examples of the hydrous oxide of aluminum and/or silicon, amine compound, and polyol compound include alumina hydrates, silica hydrates, triethanolamine, and trimethylolethane. The above surface treatment method is not particularly limited and any method may be employed. The amount of the surface treating agent provided to the surface of each titanium oxide particle by this treatment is not particularly limited but suitably 0.1 to 10.0% by mass with respect to titanium oxide when the reflection properties of titanium oxide and the moldability of the polycarbonate resin composition are taken into consideration.

The amount of the surface acid of the titanium oxide used in the present invention is preferably 10 micromoles/g or more and the amount of the surface base is preferably 10 micromoles/g or more. When the amount of the surface acid is smaller than 10 micromoles/g and the amount of the surface base is smaller than 10 micromoles/g, reactivity with an organosiloxane compound as a stabilizer lowers, whereby the dispersion of the titanium oxide may become unsatisfactory and the luminance of the molded product may become unsatisfactory. The amount of the surface acid of the titanium oxide is more preferably 15 micromoles/g or more, still more preferably 16 micromoles/g or more and the amount of the surface base is more preferably 20 micromoles/g or more, still more preferable 25 micromoles/g or more.

The particle diameters of the above titanium oxide powders are not particularly limited, but titanium oxide powders having an average particle diameter of 0.1 to 0.5 μm are preferred in order to exhibit the above effect efficiently.

The amount of the titanium oxide in the polycarbonate resin composition of the present invention is 20 to 60% by mass, preferably 30 to 50% by mass with respect to 100 parts by mass of the total of the polycarbonate-based polymer mixture and the titanium oxide. When the amount of the titanium oxide is smaller than 20% by mass, a reduction in light reflectance becomes large and light shielding properties become unsatisfactory disadvantageously. When the amount is larger than 60% by mass, it is difficult to form a sheet.

As a housing structure for backlights for use in liquid crystal televisions and monitors which must have light shielding properties and high light reflectance, the amount of the titanium oxide is more preferably 30 to 50% by mass.

To mix the titanium oxide with a polycarbonate-based resin, a decomposition inhibitor must be mixed to suppress the decomposition and deterioration of the resin by the titanium oxide. The decomposition inhibitor is used in an amount of 0.1 to 5% by mass based on the total amount of the composition. When the amount of the decomposition inhibitor falls within the above range, the effect of suppressing the decomposition and deterioration of the resin becomes satisfactory and a mold deposit is not generated. The decomposition inhibitor is preferably an organosiloxane such as an alkyl hydrogen silicone or alkoxysilicone having a reactive group such as a methoxy group or an ethoxy group. Examples of the alkyl hydrogen silicone include methyl hydrogen silicone and ethyl hydrogen silicone, and examples of the alkoxysilicone include methoxysilicone and ethoxysilicone.

Examples of the flame retardant used optionally include known compounds such as organic metal salt compounds, inorganic silicic acid and silicate compounds thereof, phosphate-based compounds, boron-based compounds, triazine-based compounds, and polyorganosiloxane-based compounds. As a flame retarding aid, a polytetrafluoroethylene resin can be used as a dripping preventing agent. The total amount of the flame retardant and the flame retarding aid is 0.1 to 5% by mass, preferably 1 to 4% by mass based on the total amount of the composition.

The polycarbonate resin composition used in the present invention may be a polycarbonate resin obtained by the method disclosed in Japanese Patent Application Laid-Open (kokai) No. 2004-91567. That is, it can be manufactured by a reaction between a diphenol and a carbonate precursor such as phosgene, or an ester interchange reaction between a diphenol and a carbonate precursor such as diphenyl carbonate in the presence of a known acid receptor and a molecular weight control agent in a solvent such as methylene chloride. The diphenol is not particularly limited herein.

The polycarbonate resin may be a homopolymer using a diphenol or a copolymer using two or more diphenols. Further, it may be a thermoplastic random polycarbonate obtained from a polyfunctional aromatic compound and a diphenol.

A polycarbonate-polyorganosiloxane copolymer (hereinafter, referred to as "PC-PDMS copolymer") may be used as the polycarbonate-based resin composition. The copolymer is a block copolymer composed of a polycarbonate block and a polyorganosiloxane block and has a viscosity average molecular weight of preferably 10,000 to 40,000, more preferably 12,000 to 35,000.

The PC-PDMS copolymer can be obtained by the method disclosed in Japanese Patent Application Laid-Open (kokai) No. 2004-91567. That is, it can be manufactured by dissolving a pre-manufactured polycarbonate oligomer (hereinafter, referred to as "PC oligomer") constituting the polycarbonate block and a polyorganosiloxane having a reactive group at a terminal and constituting the polyorganosiloxane block (for example, polydialkylsiloxane such as polydimethylsiloxane (PDMS) or polydiethylsiloxane, or polymethylphenylsiloxane) in a solvent such as methylene chloride, chlorobenzene, or chloroform, adding a sodium hydroxide aqueous solution of bisphenol, and carrying out an interfacial polycondensation reaction in the presence of triethylamine or trimethylbenzyl ammonium chloride as a catalyst. PC-PDMS copolymers manufactured by the method disclosed in JP-B 44-30105 and the method disclosed in JP-B 45-20510 may also be used.

When the above copolymer is selected as the polycarbonate-based resin composition, the obtained housing structure can achieve UL94 V-0 rating in a flame retardancy test without mixing a phosphorus-based flame retardant at a sheet thickness of 1 mm or less.

A polycarbonate-based resin composition containing 20 to 60% by mass of titanium oxide can be obtained by mixing together predetermined amounts of a polycarbonate-based resin, titanium oxide, an antioxidant or decomposition inhibitor, and optionally a flame retardant and a flame retarding aid, and melt kneading them together. The mixing and melt kneading can be carried out by using commonly used means such as a ribbon blender, Henschel mixer (trade name), Banbury mixer, drum tumbler mixer, single-screw extruder, double-screw extruder, co-kneader, or multi-screw extruder. The heating temperature for melt kneading is generally selected from a range from 240 to 320° C.

A release agent, antistatic agent, and colorant may be suitably added to the polycarbonate-based resin composition of the present invention.

The polycarbonate-based resin composition containing titanium oxide is molded into a sheet having a thickness of 1.5 to 4 mm by known extrusion molding or roll molding.

A housing structure for a lighting device which is a molded product having a thickness of 1.5 to 3.5 mm and a desired shape such as a box-like shape including functionally required shapes such as flat plate-like, wavy plate-like, hole-like, depression-like, and projection-like shapes can be formed from the obtained sheet having a thickness of 1.5 to 4 mm by thermoforming such as vacuum forming or pressing.

When the thickness of the molded product is 1.5 mm or more, the strength of the housing structure for a lighting device is satisfactory and when the thickness of the molded product is 3.5 mm or less, a thick forming sheet does not need to be used, the preheating time does not need to be extended, a rough surface produced by surface overheating is not existent, a good appearance and excellent reflectance can be ensured, and an increase in weight is not incurred.

Sheet Molding and Thermoforming Will be Described Hereinafter.

In the housing structure for a lighting device of the present invention, to provide light source support portions integrally on the inner bottom portion, a mold designed to form the light source support portions at predetermined positions is used to mold the sheet.

In the housing structure for a lighting device of the present invention, in the case of a box-like housing, rib structures are formed by folding back the upper end portions to increase the stiffness of the whole housing and improve resistance to external force.

When the upper portions of the rib structures are made flange portions, portions for fixing a light diffusing plate can be integrally formed on the flange portions advantageously.

To form those rib structures, a mold designed to have a predetermined shape may be used.

Further, when a box-like housing is to be manufactured, the bottom portion may have rib structures or projection portions according to optical design. In this case, the sheet is molded by using a designed predetermined mold.

The light diffusing plate is fixed at a position about 10 mm away from the light source cross-section, and the light diffusing plate support portions at a predetermined height may be integrally projected from the bottom as the light diffusing plate may be deflected by heat or cause nonuniformity in luminance. The installation positions and the required number of the light diffusing plate support portions are determined according to the thickness and the material of the light diffusing plate (optical sheet) and a sheet is molded by using a predetermined mold designed according to those so that the light diffusing plate support portions can be integrally formed on the bottom portion.

Further, the light diffusing plate support portions may be formed as molded products integrally formed on the fluorescent tube support portions, the rib structures at the bottom portions or the tops of projection portions provided according to optical design. In the case of this constitution, design complication which is caused by installing the fluorescent tube support portions on the bottom portion or projection portions provided according to optical design and interposing optical sheet holding portions between them can be eliminated.

Moreover, light shielding properties can be further improved by forming a light shielding layer on the exterior surface of the housing structure for a lighting device of the present invention. Particularly when the thickness of the molded housing is small or when the content of titanium oxide in the polycarbonate is relatively small, the formation of the layer on the exterior surface is effective in improving light shielding properties.

The light shielding layer which can be used in the present invention is formed to cut visible radiation or suppress the permeation of visible radiation to the opposite side (outermost layer) of the reflection layer. The light shielding layer is made of a base agent (binder) containing a black pigment dispersed therein. An acrylic urethane-based resin is generally used as the base agent. Examples of the black pigment include carbon black, lampblack, hornblack, graphite, iron black, aniline black, cyanine black, and color-mixed coloring materials of a dye or pigment. Carbon black is particularly preferred.

The thickness of the light shielding layer is preferably 1 to 30 µm, more preferably 1 to 20 µm, still more preferable 2 to 20 µm. When the thickness of the light shielding layer is smaller than 1 µm, the suppression of the permeation of visible light may become unsatisfactory, and when the thickness is larger than 30 µm, drying efficiency lowers at the time of forming the light shielding layer by coating, whereby the drying time becomes long disadvantageously.

As for the light shielding layer, commercially available coating compositions such as the SY915 Japanese ink JK manufactured by Tokyo Printing Ink MFG. Co., Ltd. and a mixture of Acrytan TSR-5 and Acrytan curing agent in a ratio of 10:1 manufactured by Dai Nippon Toryo Co., Ltd. can be preferably used.

In the present invention, a light resistant coating layer may be formed on the inner portion of the box-like molded product.

The light resistant coating layer used in the present invention has the function of cutting or absorbing ultraviolet radiation. The cutting or absorption of ultraviolet radiation can be realized by containing at least one selected from a light stabilizer and an ultraviolet absorbent in the light resistant coating layer. Examples of the light stabilizer and ultraviolet absorbent include hindered amine-based, salicylic acid-based, benzophenone-based, benzotriazole-based, benzoxazinone-based, cyanoacrylate-based, triazine-based, benzoate-based, oxalic acid anilide-based, and organic nickel-based organic compounds and inorganic compounds such as sol and gel.

Out of those, hindered amine-based compounds, benzophenone-based compounds, and benzotriazole-based compounds are preferred.

In the present invention, to further facilitate the formation of the light resistant coating layer containing a light stabilizer and/or ultraviolet absorbent, another resin component is preferably mixed with the light stabilizer and/or ultraviolet absorbent. That is, a mixed solution of a resin component and a light stabilizer and/or ultraviolet absorbent dissolved in a solvent, a liquid prepared by dissolving a resin component and one of a light stabilizer and/or an ultraviolet absorbent and dispersing the other, or a mixed liquid prepared by dissolving or dispersing a resin component and a light stabilizer and/or ultraviolet absorbent in a solvent separately and mixing them together is preferably used as a coating liquid. In this case, the solvent is one or more kind suitably selected from water and organic solvents. A copolymer of a light stabilizer component and/or ultraviolet absorbent component and a resin component is also preferably used directly as a coating liquid.

In the present invention, an acrylic resin or methacrylic resin containing a light stabilizer component and/or an ultraviolet absorbent component is preferably used in the light resistant coating layer. When the above component(s) is/are copolymerized, a polymerizable light stabilizer component and/or ultraviolet absorbent component are/is preferably copolymerized with an acrylic monomer component or methacrylic monomer component.

The polymerizable light stabilizer component and ultraviolet absorbent component are each preferably one or more kind selected from hindered amine-based, benzotriazole-based, benzophenone-based, benzoxazinone-based, cyanoacrylate-based, triazine-based, and malonate-based compounds. Those polymerizable light stabilizer component and ultraviolet absorbent component should be compounds which have a hindered amine, benzotriazole, benzophenone, benzoxazinone, cyanoacrylate, triazine, or malonate in the basic skeleton and a polymerizable unsaturated bond. They are generally acrylic or methacrylic monomer compounds having a functional group derived from those compounds having light absorbing or ultraviolet absorbing ability in the side chain.

Although the copolymerization ratio of the polymerizable light stabilizer component and/or ultraviolet absorbent component to a monomer to be copolymerized is not particularly limited, the ratio of the polymerizable light stabilizer component and/or ultraviolet absorbent component is preferably 10% by mass or more, more preferably 20% by mass or more, still more preferable 35% by mass or more. The light resistant coating layer may contain a polymer obtained by polymerizing the polymerizable light stabilizer component and/or ultraviolet absorbent component without using the above monomer. The molecular weight of the polymer is not particularly limited but generally 5,000 or more, preferably 10,000 or more, more preferably 20,000 or more from the viewpoint of the stiffness of the coating layer. The polymer is used in a dissolved or dispersed state in an organic solvent, water, or a mixture of an organic solvent and water. Commercially available hybrid light stabilizing polymers may be used besides the above copolymer. "U-W" manufactured by Nippon Shokubai Co., Ltd., which contains a copolymer of an acrylic monomer, light stabilizer, and ultraviolet absorbent as an effective component and "HC-935UE" manufactured by Ipposha Oil Industries Co., Ltd., which contains a copolymer of an acrylic monomer and an ultraviolet absorbent as an effective component may be used.

In the present invention, additives such as a fluorescent brightener and antistatic agent may be added in a range not impairing the reflection properties and light resistance of the light resistant coating layer. Preferred examples of the fluorescent brightener include commercially available products such as UVITEX (trade name: manufactured by Ciba Specialty Chemicals Co., Ltd.), OB-1 (trade name: manufactured by Eastman Co., Ltd.), TBO (trade name: manufactured by Sumitomo Seika Chemicals, Co., Ltd.), Kaycoll (trade name: manufactured by Nippon Soda Co., Ltd.), Kayalight (trade name: manufactured by Nippon Kayaku Co., Ltd.), and Leucophor EGM (trade name: manufactured by Clariant Japan Co., Ltd.). The content of the fluorescent brightener in the light resisting layer is preferably 0.01 to 2% by mass, more preferably 0.03 to 1.5% by mass, still more preferable 0.05 to 1% by mass. When the content is lower than 0.01% by mass, its effect is small and when the content is higher than 2% by mass, the obtained molded product becomes yellowish or its durability tends to lower. As the antistatic agent, a phosphonium sulfonate and the like may be used.

The housing structure of the present invention has the function of a light reflecting layer or a light reflecting plate (light reflection sheet) due to the characteristic feature of the polycarbonate-based resin composition of the present invention. Reflectance can be further improved by bonding a light reflecting film to the reflection surfaces (inner bottom and side surfaces of the structure) of the housing structure for a lighting device of the present invention. The thickness of the light reflecting film is about 50 µm to 1.5 mm, preferably about 0.2 to 1.5 mm.

The light reflecting film is a porous product obtained by stretching a thermoplastic resin which is transparent in an amorphous state or a foamed product obtained by super critical fluid foaming and has a light reflectance of 95% or more.

The thermoplastic resin which is transparent in an amorphous state is a polypropylene-based resin or polyester (PET)-based resin having a crystallization speed of several minutes.

The resin which is transparent in an amorphous state and is stretched to obtain a porous product is, for example, a transparent resin which contains a small amount of an inorganic particulate material as a nucleating agent for controlling crystallization by copolymerization or forming voids by stretching.

Examples of the inorganic particulate material include inorganic fillers such as calcium carbonate, calcium sulfate, barium sulfate, talc, silica, and alumina, and the adding amount of the inorganic particulate material is generally about 0.1 to 20% by mass. A porous product is used, which is obtained by forming a resin including the above inorganic filler into a film or sheet by extrusion molding and stretching the obtained film or sheet.

Examples of the porous product having voids formed by stretching include the E60L manufactured by Toray Industries, Inc. as a polyethylene terephthalate resin and the White Refstar manufactured by Mitsui Chemical Co., Ltd. as a polypropylene resin.

Examples of the foamed product obtained by super critical foaming include the MC-PET of the Furukawa Electric Co., Ltd.

When it is difficult to integrally bond the above foamed film or sheet due to the design shape of a lighting device such as a backlight, the film or sheet may be processed into a predetermined shape by cutting, perforation, or bending, and the processed film or sheet may be laminated on the reflection surfaces of the housing structure. To bond the film or sheet, a two-sided adhesive tape is preferably used. A preferred example of the pressure-sensitive adhesive double coated tape is the Y-4950 adhesive tape for VHR acrylic foamed structures manufactured by Sumitomo 3M Limited.

As the light reflecting film, a film molded out of a thermoplastic resin composition may be used, in which includes: alight reflecting thermoplastic resin material including as a matrix resin component a polycarbonate-based resin, polyester-based resin or polypropylene-based resin; and 8 to 50% by mass of a white pigment, 0.1 to 5% by mass of an antioxidant or decomposition inhibitor, and, as optional components, 0.1 to 5% by mass of the total of a flame retardant and a flame retarding aid. A light reflecting layer or light reflecting plate obtained by using this thermoplastic resin composition is excellent in reflectance, light shielding properties, and light resistance. When the content of the white pigment falls within the above range, light shielding properties and reflectance become excellent and the white pigment can be blended into the polycarbonate-based resin and polyester-based resin or polypropylene-based resin without a problem.

The polycarbonate-based resin as a matrix resin component for fixing a reflective white pigment can be obtained by the method disclosed in Japanese Patent Application Laid-Open (kokai) No. 2004-91567, for example. For instance, it can be manufactured by a reaction between a diphenol and a carbonate precursor such as phosgene, or an ester interchange reaction between a diphenol and a carbonate precursor such as diphenyl carbonate in the presence of a known acid receptor and a molecular weight control agent in a solvent such as methylene chloride. The diphenol is not particularly limited herein. The polycarbonate resin may be a homopolymer of a diphenol or a copolymer of two or more diphenols. Further, the polycarbonate resin may be a thermoplastic random polycarbonate obtained from a polyfunctional aromatic compound and a diphenol.

Examples of the polyester-based resin include polyethylene terephthalate resin (PET), a copolymer of terephthalic acid and isophthalic acid, a polymer of terephthalic acid and 1,3-propanediol or 1,4-butanediol, and polybutylene terephthalate resin (PBT). Examples of the polypropylene-based resin include a homopolymer of propylene, and a copolymer of propylene and one or more comonomer selected from ethylene and olefins each having 4 or more carbon atoms such as an olefin having 4 to 20 carbon atoms.

Various white pigments may be used, for example, titanium oxide, zinc oxide, lithopone, zinc sulfide, and lead white can be used. Of those, titanium oxide is preferred because it has excellent staining power. Titanium oxide may be of a rutile type or anatase type, but the rutile type is preferable because it has excellent heat stability and weatherability. The titanium oxide is preferably surface-treated with various surface treating agents such as hydrate alumina, silica, or zinc.

In the housing structure of the present invention, it is preferred that the bottom portion of the box-like molded product should have a total light reflectance (Y value) for reflected light of 95% or more and a total light transmittance of 1% or less.

This can be attained by controlling the polycarbonate-based resin composition, using the above light reflecting film or forming a light shielding layer.

When the Y value of the bottom portion of the molded product is 95% or more, a practical level of luminance can be achieved and when the total light transmittance is 1% or less, light leakage to the back side can be suppressed.

Tap holes for attaching other parts can be made in the rear or front surface of the housing structure. A required number of the tap holes are formed in the rear portion or the side portions by using a mold designed to prevent them from overlapping with the light source (fluorescent tube) support portions.

In the housing structure of the present invention, a recessed storage portion for storing a drive circuit substrate may be integrated with the top of one of box-like upper end portions.

More specifically, a bag-like or groove-like recessed portion corresponding to the size of a circuit substrate for driving a liquid crystal panel is formed in one of the upper and lower (right and left in FIG. 12) rib structures in such a manner that it is open to the top end side.

The recessed storage portion can be integrated with the box-like upper end portion by molding a sheet using a predetermined mold designed according to the shape of the recessed storage portion.

Further, linear or point light sources are incorporated into the housing structure of the present invention, a light diffusing plate is placed above the light sources, and further optical films are laminated to construct a backlight.

The optical films to be laminated are light diffusing films which are used to make the surface luminance of the backlight device uniform or prism sheets having the function of improving luminance. A plurality of the above optical films and a plurality of the above prism sheets are used according to the control of luminance and luminance uniformity.

A liquid crystal display member can be manufactured by incorporating linear or point light sources in the housing structure for a lighting device of the present invention, placing a light diffusing plate, optical films, and a liquid crystal panel in the stated order above the light sources, and attaching peripheral frame members around them to assemble them.

Since the peripheral frame members are used to protect and assemble the liquid crystal display member, they must have resistance to external impact and scratches and are desirably made of a metal from those viewpoints.

The metal is desirably an aluminum alloy, titanium alloy, or iron which is used in a chassis for electronic equipment from the viewpoints of stiffness, processability, lightweight and actual use performance.

The above metal is generally used as a plate material and the peripheral frame members having a predetermined shape can be formed from the metal by bending or punching with a press.

Besides the above plate material, an atypical aluminum extruded material may be cut to a predetermined size and used, which is extruded linearly into a shape having a groove of a predetermined size, and capable of storing a housing for a lighting device and a liquid crystal display member by the atypical extrusion of aluminum or aluminum alloy like an aluminum sash as a construction material.

The peripheral frame members are painted a desired color according to required properties such as design, reflection prevention, and corrosion prevention. As for painting, a primary coat, intermediate coat, and clear coat are applied in this order, and four frame members may be painted after they are attached and assembled.

Four peripheral frame members are required and have a predetermined length, and L-shaped corner members are used to connect those four peripheral frame members so as to construct a peripheral frame. Alternatively, a U-shaped member having a bottom side and left and right sides continuous to the bottom side, or a U-shaped member having the top and bottom sides continuous to one of the left and right sides is manufactured by cutting out the side portions of corner portions from a linear member and bending it, and a peripheral frame member corresponding to the side on the open side is connected to the above U-shaped member by the above corner members to surround the housing structure with those peripheral frame members. Further, a peripheral frame can also be constructed by manufacturing an L-shaped corner member having the left side and the bottom side, and an L-shaped member having the right side and the top side, and combining them.

In the liquid crystal display member of the present invention, to improve the total strength, reinforcing frames may be attached to the peripheral frame members on the rear side. In this case, it is effective that a suitable number of the reinforcing frames should be fixed between the top and bottom frames on the rear side or that reinforcing frames should be attached obliquely to fix the four corners. Reinforcing frames having a flat plate-like cross section, hollow flat pipe-like cross section, and inverted U-shaped pipe-like cross section are preferred from the viewpoint of balance between lightweight and stiffness, and the like. The reinforcing frames may be fixed with screws, rivets, or an adhesive. The material of the reinforcing frame is preferably a reinforced plastic having high stiffness or the same material as the peripheral frame from the viewpoint of a reinforcing effect.

The reinforcing frames are not limited to the above columnar reinforcing frames but may have such a planar shape to cover all or part of the rear side with a reinforcing rib or swollen portion.

In the method of manufacturing the housing structure for a lighting device of the present invention, the polycarbonate-based resin composition containing titanium oxide is formed into a sheet having a thickness of 1.5 to 4 mm by known extrusion molding, or roll forming, or the like.

A housing structure for a lighting device which is a molded product having a thickness of 1.5 to 3.5 mm, equipped with functionally required shapes such as flat plate-like, wavy plate-like, hole-like, concave, and convex shapes and light source terminal fixing portions integrally formed on the inner side portions can be formed from the obtained sheet having a thickness of 1.5 to 4 mm by thermoforming such as vacuum forming or pressing.

When the thickness of the molded product is 1.5 mm or more, the strength of the housing structure for a lighting device is satisfactory and when the thickness of the molded product is 3.5 mm or less, a thick forming sheet does not need to be used, the preheating time does not need to be extended, a rough surface caused by surface overheating does not occur, a good appearance and excellent reflectance can be ensured, and an increase in weight is not incurred.

As for the thermoforming, more specifically, the obtained sheet is heated and formed with vacuum pressure and/or the pressure of compressed air. Heating may be carried out from one side or both sides of the sheet, or the sheet may be brought into direct contact with a heat source to be heated. The sheet heating temperature (sheet surface temperature) at the time of thermoforming is 160 to 200° C., preferably 170 to 200° C., and the average expansion rate is 1.2 to 2 times, preferably 1.2 to 1.8 times.

When the heating temperature is lower than 150° C., the sheet may not be formed uniformly, and when the temperature is higher than 200° C., the foaming of the sheet readily occurs. Thermoforming is not particularly limited, and it may be simple vacuum forming, drape forming, matched die forming, pressure bubble plug assist vacuum forming, plug assist forming, vacuum snap back forming, pressure bubble vacuum snap back forming, air slip forming, trapped sheet contact heating-pressure forming, or simple pressing. The molding pressure is preferably 101 kPaG or less in the case of vacuum forming and 294 to 784 kPaG in the case of pressure molding. Vacuum forming and pressure molding can be carried out in combination. A shape which enables homogenous surface reflection can be obtained by this thermoforming according to the type and number of light sources.

The sheet used for the thermoforming is preferably pre-dried, thereby making it possible to prevent a foaming phenomenon caused by moisture absorption. As for the drying conditions, drying is suitably carried out at a temperature of 120 to 140° C. for a time of 2 to 10 hours.

According to the present invention, because a housing structure for a lighting device has such a structure that a reflecting plate for reflecting light from light sources arranged therein in a specific direction is integrated with light sources, support portions composed of optical sheets or the like, and fixing portions by means of a polycarbonate-based resin composition containing titanium oxide and it serves as a chassis itself, there can be provided a housing structure for a lighting device which is light in weight and has a small number of assembly steps and a backlight device using the housing structure for a lighting device.

The method of manufacturing the housing structure for a lighting device of the present invention includes the steps of forming a polycarbonate-based resin composition containing 20 to 60% by mass of titanium oxide having excellent reflection performance into a sheet and vacuum forming or pressing the sheet. Therefore, there can be provided a method of manufacturing a housing structure for a lighting device which does not require the insert molding of a metal chassis and the attachment of other members such as a lamp holder and a lamp support, and is light in weight and has a small number of assembly steps.

Further, because a backlight which incorporates light sources in the housing structure for a lighting device of the present invention is assembled with a liquid crystal unit by peripheral frame members to fabricate a liquid crystal display member, the number of assembly steps can be reduced.

EXAMPLES

The present invention will be described in detail with reference to examples and comparative examples but not limited thereto.

Manufacturing Example 1

1.1 parts by mass of reactive polyorganosiloxane (trade name: BY16-161 manufactured by Toray Dow Corning Co., Ltd.), 0.3 part by mass of polytetrafluoroethylene (PTFE, trade name: CD076 manufactured by Asahi Glass Co., Ltd.), and 0.1 part by mass of triphenyl phosphine (trade name JC263 manufactured by Johoku Chemical Co., Ltd.) as an antioxidant were mixed with 100 parts by mass of the total of 46% by mass of a copolymer of polycarbonate and polyorganosiloxane [PC-PDMS, Mv=17,000, PDMS content of 3.0%, containing 3% by mass of polydimethylsiloxane block unit (30 repeating units) based on a polycarbonate block unit obtained from bisphenol A, viscosity average molecular weight of 17,000], 24% by mass of a bisphenol A type linear polycarbonate (trade name: Tarflon FN2500A manufactured by Idemitsu Kosan Co., Ltd., Mv=25,000), and 30% by mass of titanium oxide powder (trade name: PF726 manufactured by Ishihara Sangyo Kaisha Ltd.), and the resulting mixture was melt-kneaded with a double-screw extruder to obtain a polycarbonate resin composition PC1.

Manufacturing Example 2

A polycarbonate resin composition PC2 was obtained by mixing and kneading in the same manner as in Manufacturing Example 1 except that 33% by mass of PC-PDMS, 16% by mass of the FN2500A bisphenol A type linear polycarbonate used in Manufacturing Example 1 and 50% by mass of the PF740 titanium oxide powder (manufactured by Ishihara Sangyo Kaisha Ltd.) were used to make 100 parts by mass.

Manufacturing Example 3

A polycarbonate resin composition PC3 was obtained by mixing and kneading in the same manner as in Manufacturing Example 1 except that 59% by mass of PC-PDMS, 31% by mass of the FN2500A bisphenol A type linear polycarbonate used in Manufacturing Example 1 and 10% by mass of the PF726 titanium oxide powder were used to make 100 parts by mass.

Sheet Manufacturing Example

The polycarbonate resin composition was extruded in a horizontal direction at a cylinder temperature of 260 to 290° C. and a dice temperature of 290° C. with a single-screw extruder having a coat hanger die with a diameter of 90 mm and a width of 1,000 mm, and the extruded product was molded with three vertical cooling rolls to obtain reflecting sheets having thicknesses of 2 mm and 3 mm, which are described in the examples.

Example 1

The sheet having a thickness of 2 mm made of the polycarbonate resin composition PC1 was heated to 180° C. and vacuum formed at 100 kPaG to obtain a thermally molded backlight housing 1 for incorporating 16 fluorescent tubes, which has flange portions 9 and folded rib structures 8 at the top thereof and a length of 750 mm, a width of 400 mm (outer sizes), and a diagonal size (inner size) of 800 mm.

In this thermally molded product, 32 electrode support portions 3 of the fluorescent tubes 2 and 32 fluorescent tube supports 4 were integrated. The interval between adjacent fluorescent tubes was 26 mm.

Figure 2:
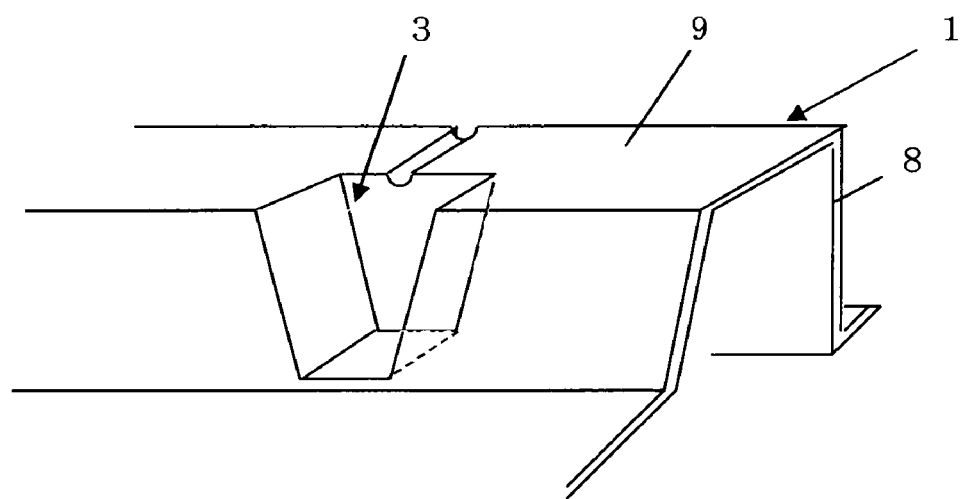
FIG. 2(A) is an enlarged perspective view of the main cross section of a fixing portion of the terminal of a fluorescent tube and FIG. 2(B) is an explanatory diagram illustrating the state where the fluorescent tube is fixed.
Figure 2:
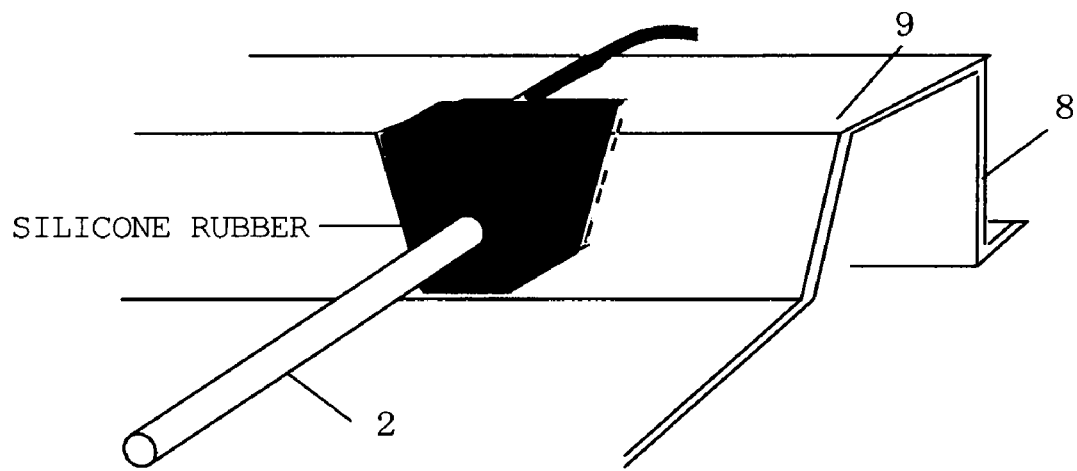
Figure 3:
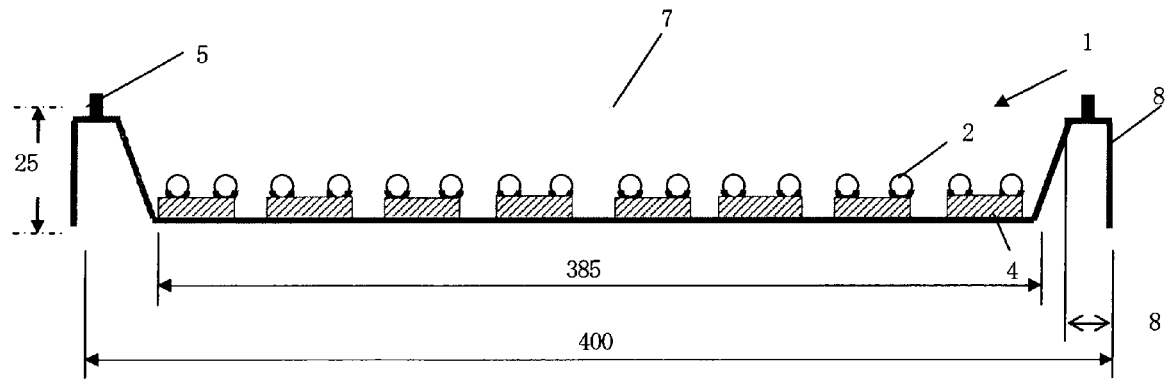
FIG. 3(A) is side view taken along the line A-A of FIG. 1 showing fluorescent tube support portions and FIG. 3(B) is an enlarged explanatory diagram view of a fluorescent support portion.
Figure 3:
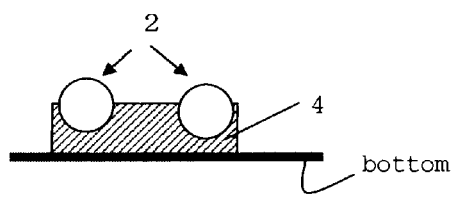

The electrode holding portions were depressions as shown in FIG. 2(A), and the fluorescent tube supports were formed such that one support could hold two fluorescent tubes as shown in FIG. 3(B) and shaped like a projection having a length of 30 mm, a width of 5 mm, and a height of 4.5 mm. As shown in FIG. 1, 10 square diffusion plate fixing portions 5 (size: 20 mm (length)×5 mm (width)×5 mm (height)) were integrally formed on the flange portions 9 (width of 18 mm) at the top of the molded product. The whole size is shown in FIG. 3(A).

The fluorescent tube supports 4 were not arranged continuously in the longitudinal direction of the fluorescent tubes, but arranged in two columns at a predetermined pitch in this example as shown in FIG. 3(A) which is a side view taken along the line A-A of FIG. 1.

Example 2

A molded product was obtained in the same manner as in Example 1 except that the thickness of the PC1 sheet was changed to 3 mm, the diagonal size of the housing was changed to 925 mm, and it was for incorporating 20 fluorescent tubes.

Example 3

A molded product was obtained in the same manner as in Example 1 except that the polycarbonate resin composition PC2 was used.

Example 4

Figure 4:
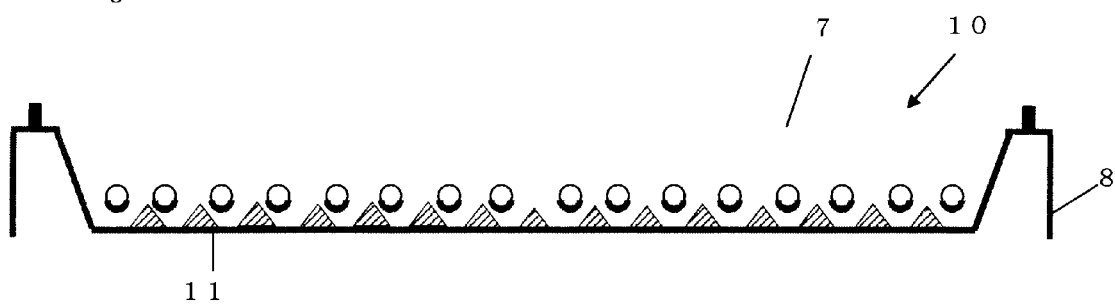
FIG. 4 is an explanatory diagram of a backlight having a housing with a wavy bottom according to Example 4 of the present invention.

A molded product was obtained in the same manner as in Example 1 except that wavy forms 11 (width of 20 mm, height of 10 mm) were interposed between fluorescent tubes on the reflection surface as shown in FIG. 4.

Example 5

A molded product was obtained in the same manner as in Example 4 except that a solvent prepared by diluting the Udable UV-G12 light stabilizer manufactured by Nippon Shokubai Co., Ltd. with diacetone alcohol to a solid content of 20% was applied with a gravure roll to form a coating film having a thickness of 10 μm on the reflection surface and dried at 80 to 120° C. in a hot air oven to form a light resistant coating layer on the reflection surface.

Example 6

Figure 5:
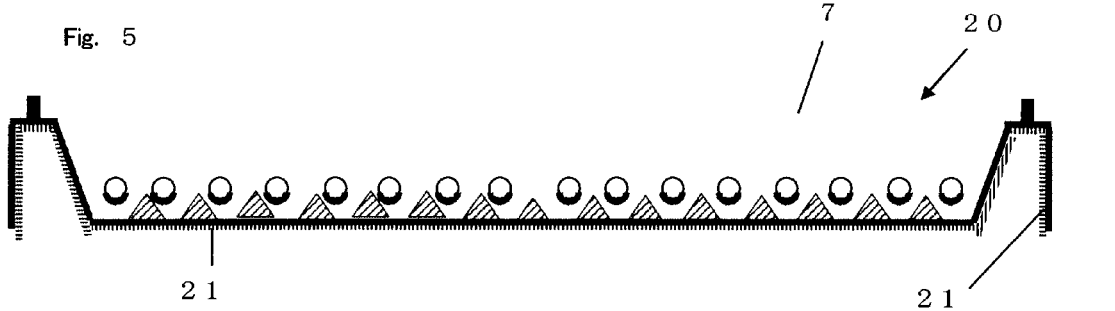
FIG. 5 is an explanatory diagram of a backlight having a light shielding coating layer according to Example 6 of the present invention.

A molded product was obtained in the same manner as in Example 4 except that the SY915 Japanese ink JK manufactured by Tokyo Ink Co. Ltd. was screen printed on the opposite side of the reflection surface and dried at 80 to 120° C. to form a light shielding layer 21 having a thickness of 30 μm as shown in FIG. 5.

Example 7

Figure 6:
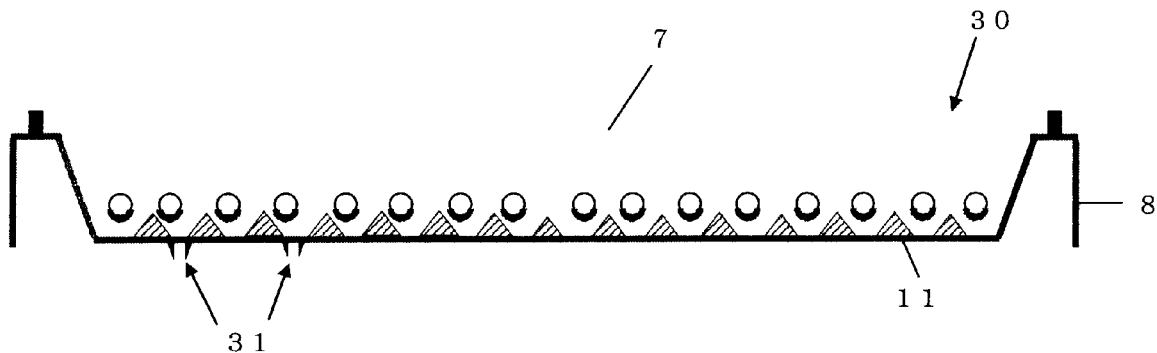
FIG. 6(A) is an explanatory diagram of a backlight housing having screw holes on the rear surface according to Example 7 of the present invention and FIG. 6(B) is an enlarged view of the screw hole.
Figure 6B:
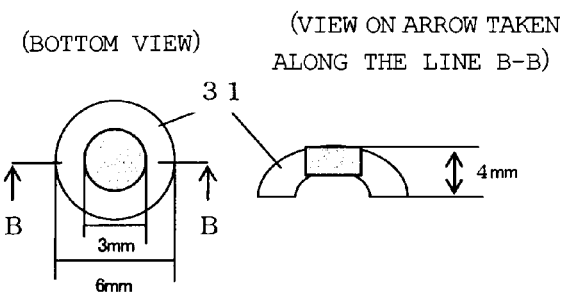

Screw holes 31 (diameter of 3 mm) for attaching a substrate was integrally formed on the rear surface at the same time as thermoforming as shown in FIG. 6.

Example 8

Figure 7:
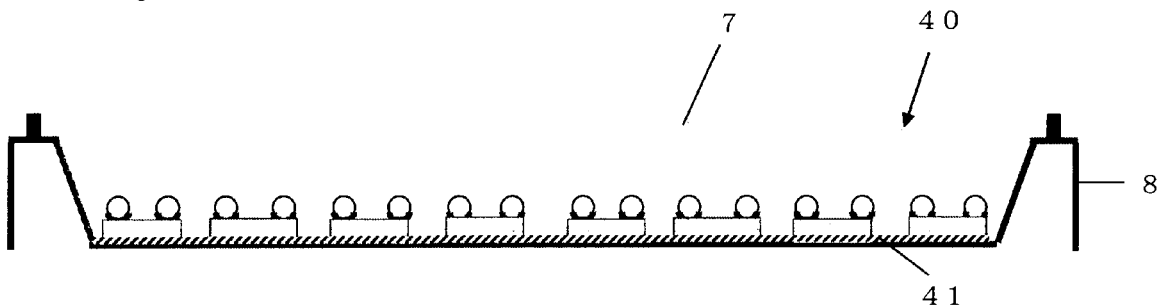
FIG. 7 is an explanatory diagram of a backlight housing having a reflecting film according to Example 8 of the present invention.

The reflection film 41 (trade name: E60V) manufactured by Toray Industries, Inc. was put on the reflection surface by using a double-sided adhesive tape as shown in FIG. 7.

Example 9

Figure 8:
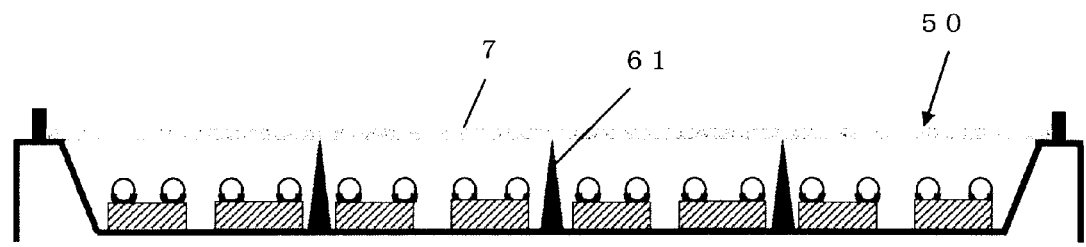
FIG. 8 is an explanatory diagram of a backlight housing having light diffusing plate support portions according to Example 9 of the present invention.
Figure 9:
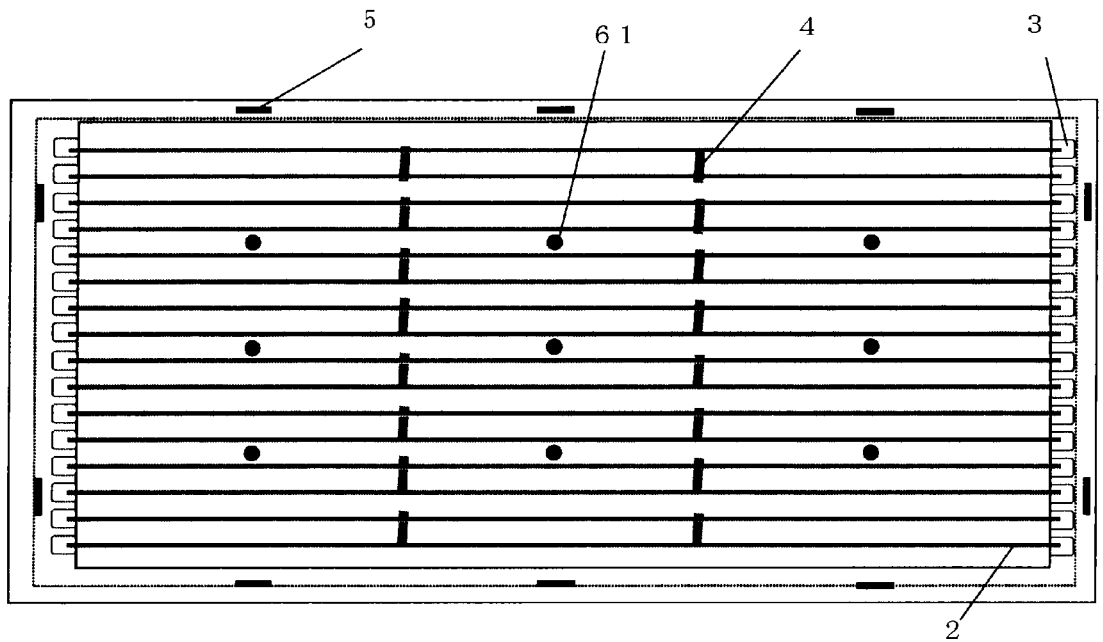
FIG. 9 is an explanatory diagram of a backlight housing showing the arrangement of the light diffusing plate support portions according to Example 9 of the present invention.

A molded product was obtained in the same manner as in Example 1 except that conical light diffusing plate support portions having a diameter of the circle at the bottom of 5 mm, a radius of the curvature at the end of 0.5 mm, and a height of 18 mm as shown in FIG. 8 were placed on the flat bottom portion of the reflection surface in three rows and three columns as shown in FIG. 9 (In this example, the inner height of the housing was 18 mm).

Example 10

Figure 10:
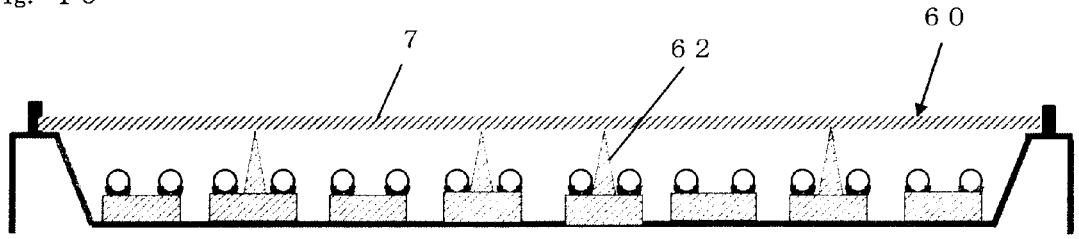
FIG. 10 is an explanatory diagram of a backlight housing having light diffusing plate support portions according to Example 10 of the present invention.

A molded product was obtained in the same manner as in Example 1 except that conical light diffusing plate support portions having a diameter of the circle at the bottom of 5 mm, a radius of the curvature at the end of 0.5 mm and, a height of 8 mm as shown in FIG. 10 were placed on the fluorescent tube support of the reflection surface (In this example, the inner height of the housing was 18 mm).

Example 11

Figure 11:
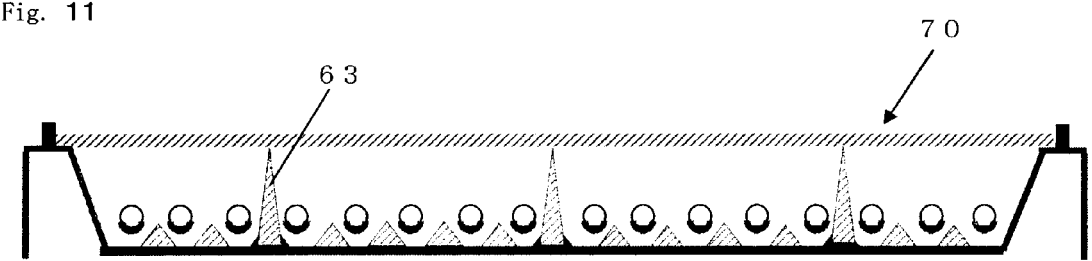
FIG. 11 is an explanatory diagram of a backlight housing having light diffusing plate support portions according to Example 11 of the present invention.

A molded product was obtained in the same manner as in Example 1 except that conical light diffusing plate support portion having a diameter of the circle at the bottom of 8 mm and a radius of the curvature at the end of 0.5 mm was formed continuously on the projections of the reflection surface having the projections with a triangular cross section as shown in FIG. 11 (the inner height of the housing of this example was 18 mm).

Example 12

Figure 12:
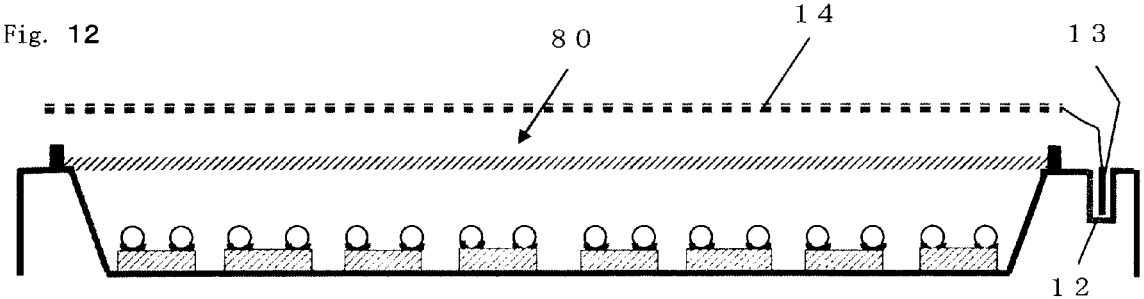
FIG. 12 is an explanatory diagram of a backlight housing having a substrate storage portion according to Example 12 of the present invention.

A recessed storage portion 12 having a width of 10 mm, a length of 20 mm, and a depth of 30 mm for storing a substrate for driving liquid crystals was integrally formed in the right top surface with an expanded width having a light diffusing plate support portion as shown in FIG. 12.

Example 13

16 fluorescent tubes (cold-cathode tube light sources) 2 were set in a backlight housing having a diagonal size of 800 mm, flange portions 9, and folded portions 8 at the upper end as shown in Example 9 such that the light diffusing plate (manufactured by Teijin Limited, trade name: Panlight Sheet, mass of 720 g) was supported by the light diffusing plate support portions 61 as shown in FIGS. 8 and 9. As a result, a backlight device having the recessed storage portion 12 at the upper end (right side in the figure) was obtained as shown in Example 12.

Figure 13:
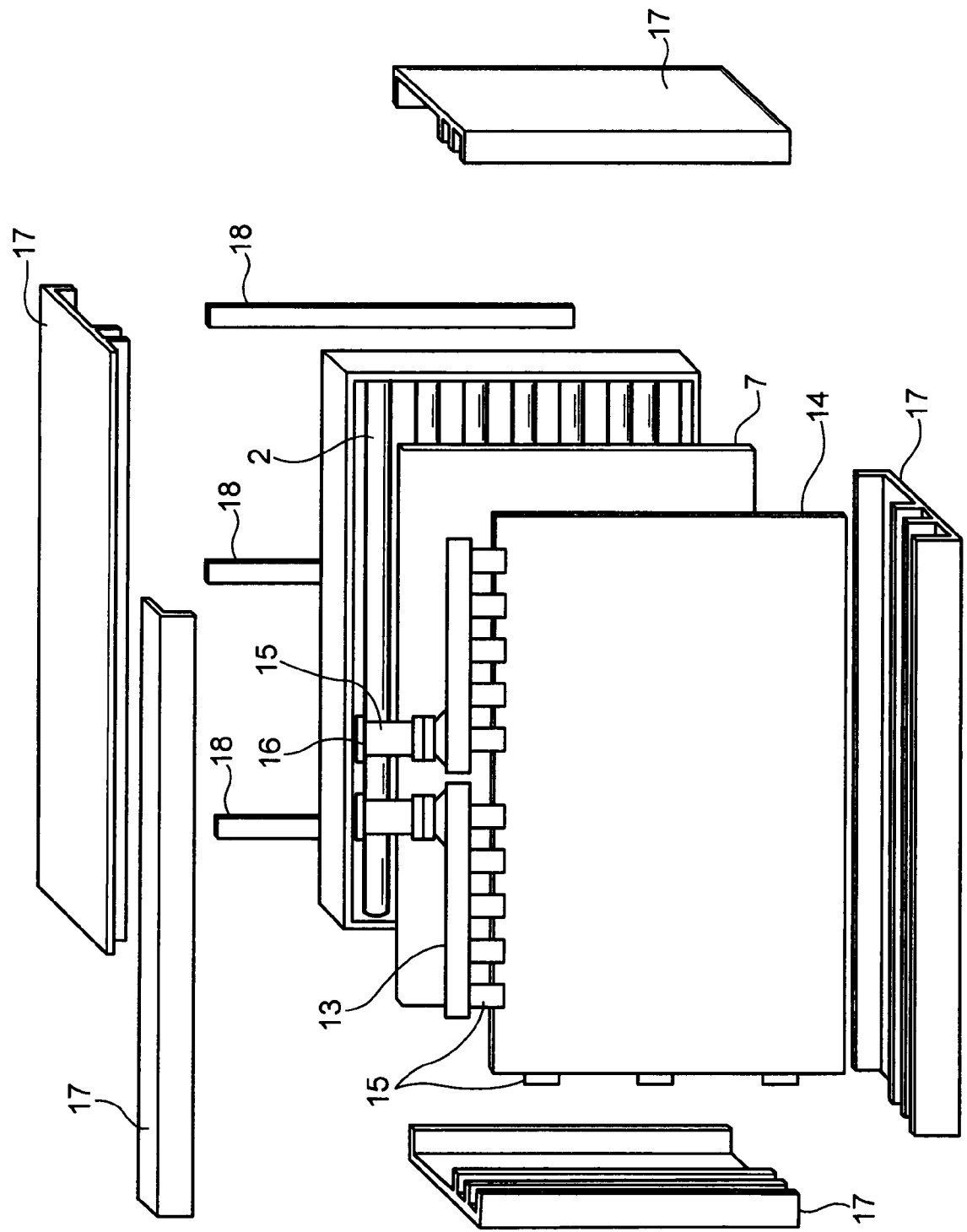
FIG. 13 is an explanatory diagram showing the whole constitution of the liquid crystal display member of the present invention.

A liquid crystal unit composed of a prism sheet (thickness of 200 μm), a reflection polarizing film (thickness of 400 μm), and a liquid crystal panel 14 was mounted onto this backlight device, circuit substrates 13 for driving liquid crystals interconnected by FPC15 were stored in the recessed storage portion 12, connectors 16 were directed toward the outside, which were assembled as the liquid crystal display member, and the periphery of the member was fixed by metal (atypical extruded product of aluminum) peripheral frames 17 as shown in FIG. 13. The peripheral frames 17 had grooves with widths corresponding to the thicknesses of the backlight device and the liquid crystal unit so that they were assembled and held while they were fitted in those grooves. Four peripheral frames 17 were fixed with screws by using substantially L-shaped connection members (not shown) and three flat reinforcing frames 18 having a thickness of 2 mm and a width of 50 mm were fixed between upper and lower peripheral frames 17 on the rear side.

The assembled liquid crystal display member had high strength as a whole. When an activation test was made, the assembled liquid crystal display member was free from luminance nonuniformity and warp, and clear liquid crystal display was obtained.

Comparative Example 1

A formed sheet having a thickness of 1 mm was formed from the same PC1 as in Example 1, and a 800 mm (32 inch) backlight housing having the same shape as that of Example 1 and an average thickness of the molded product of 1 mm was produced by using this sheet in the same manner as in Example 1.

Comparative Example 2

A formed sheet having a thickness of 5 mm was formed from the above PC1 to produce a 800 mm (32 inch) backlight housing having the same shape as that of Example 1 and an average thickness of the molded product of 4 mm.

Comparative Example 3

A thermally molded backlight housing for 16 fluorescent tubes which was the same as Example 1 was obtained by heating a 2 mm-thick sheet of the polycarbonate resin composition PC3 at 180° C. for vacuum forming.

Reference Example 1

A backlight was assembled by setting fluorescent tube terminal fixing parts, fluorescent tube supports, and other required parts in a backlight housing (chassis) composed of a 1 mm-thick iron sheet metal which was the same size as that of Example 1.

Reference Example 2

A backlight was assembled in the same manner as in Reference Example 1 except that MCPET (PET reflection sheet manufactured by Furukawa Electric Co., Ltd.) as a reflection layer was made wavy and bonded to the same housing as in Reference Example 1.

The constitutions of the backlight housings of the examples, comparative examples, and reference examples are shown in Table 1.

(5) rough surface: the irregularity of the surface was observed visually, and when it was significant, it was NG.
(6) reflectance (Y value): this means a stimulus value Y when three stimulus values X, Y, Z of the color of a sample (molded product) were obtained by spectrophotometric colorimetry in accordance with the method specified by JIS K7105, and this Y value corresponds to a luminance factor or luminous reflectance, and the reflectance at 400 to 700 nm including mirror reflection was measured with the light source at a view angle of 10° by using the MS2020 Plus (trade name) color difference meter manufactured by Macbeth Co., Ltd. and defined as reflectance (Y value).

TABLE 1

| | PC | average thickness of molded product (mm) | diagonal size of molded product (inner size, mm) | layer constitution | shape of reflection surface | others |
|---|---|---|---|---|---|---|
| Example 1 | PC1 | 2 | 800 (32 inch) | single layer | flat | — |
| Example 2 | PC1 | 3 | 925 (37 inch) | single layer | flat | — |
| Example 3 | PC2 | 2 | 800 (32 inch) | single layer | flat | — |
| Example 4 | PC1 | 2 | 800 (32 inch) | single layer | wavy | — |
| Example 5 | PC1 | 2 | 800 (32 inch) | presence of light resistant coating | wavy | — |
| Example 6 | PC1 | 2 | 800 (32 inch) | presence of light resistant coating | wavy | — |
| Example 7 | PC1 | 2 | 800 (32 inch) | single layer | wavy | tapped rear surface |
| Example 8 | PC1 | 2 | 800 (32 inch) | lamination layer of reflection film | flat | combination of reflection films |
| Example 9 | PC1 | 2 | 800 (32 inch) | single layer | flat | optical sheet support provided |
| Example 10 | PC1 | 2 | 800 (32 inch) | single layer | flat | optical sheet support provided |
| Example 11 | PC1 | 2 | 800 (32 inch) | single layer | wavy | optical sheet support provided |
| Example 12 | PC1 | 2 | 800 (32 inch) | single layer | flat | liquid crystal substrate storage portion provided |
| Comparative Example 1 | PC1 | 1 | 800 (32 inch) | single layer | flat | — |
| Comparative Example 2 | PC1 | 4 | 800 (32 inch) | single layer | flat | — |
| Comparative Example 3 | PC3 | 2 | 800 (32 inch) | single layer | flat | — |
| Reference example 1 | sheet metal (iron) chassis 1 mm | | 800 (32 inch) | — | — | |
| Reference example 2 | sheet metal (iron) chassis 1 mm | | 800 (33 inch) | lamination layer of MCPET | wavy | wavy MCPET bonded to reflection surface |

Figure 14:
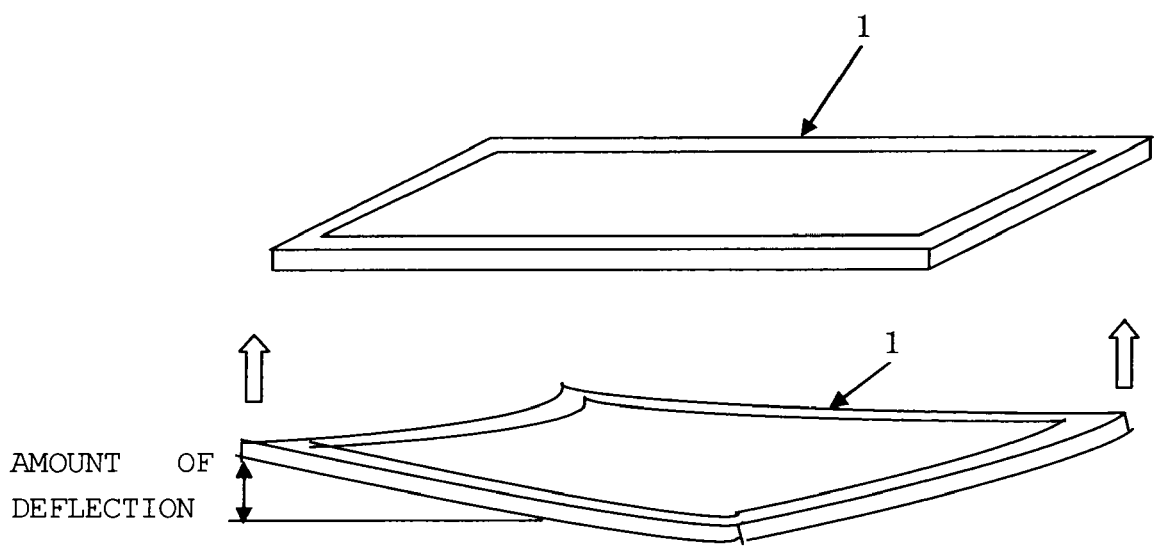
FIG. 14 is an explanatory diagram showing the procedure of measuring the amount of deflection of the housing structure.

The backlight housings obtained in the examples, comparative examples, and reference examples were evaluated by the following methods.
(1) average thickness of molded product: the average value of thicknesses of the center portion and four corners of the bottom.
(2) amount of deflection: when a thermally molded product (backlight housing) was placed on a flat plane and two opposing corners thereof were lifted as shown in FIG. 14, the height of the corners rising from the plane while the other two opposing corners were placed on the plane was defined as the amount of deflection.
(3) total light transmittance: the transmittance of the thinnest portion of a molded product was measured by using the HGM-2DP (trade name) direct-reading haze computer manufactured by Suga Test Instruments Co., Ltd. in accordance with JIS K7105.
(4) light shielding properties: fluorescent tubes were installed in the housing and the presence or absence of light leakage was observed visually from the back.

(7) assembly easiness: assembly easiness was compared between when a reflection film, fluorescent tube holding portions, fluorescent tube supports, diffusion plate supports, and the like were set in the chassis of the reference examples and when the housing of this example or the like was used to construct a backlight unit.

Those evaluation results are shown in Table 2.

TABLE 2

| | amount of deflection (mm) | total light transmittance (%) | rough surface | reflectance (Y value) (%) | assembly easiness |
|---|---|---|---|---|---|
| Example 1 | 30 | 0.2 | absent | 98.6 | ○ |
| Example 2 | 50 | <0.1 | absent | 98.6 | ○ |
| Example 3 | 30 | 0.2 | absent | 98.8 | ○ |
| Example 4 | 30 | 0.2 | absent | 98.6 | ○ |
| Example 5 | 30 | 0.2 | absent | 98.3 | ○ |
| Example 6 | 30 | <0.1 | absent | 98.6 | ○ |
| Example 7 | 30 | 0.2 | absent | 98.6 | ○ |

TABLE 2-continued

| | amount of deflection (mm) | total light transmittance (%) | rough surface | reflectance (Y value) (%) | assembly easiness |
|---|---|---|---|---|---|
| Example 8 | 30 | <0.1 | absent | 100.5 | ○ |
| Example 9 | 30 | 0.2 | absent | 98.6 | ○ |
| Example 10 | 30 | 0.2 | absent | 98.6 | ○ |
| Example 11 | 30 | 0.2 | absent | 98.6 | ○ |
| Example 12 | 30 | 0.2 | absent | 98.6 | ○ |
| Comparative Example 1 | 80 | 0.7 | absent | 98.6 | ○ |
| Comparative Example 2 | 15 | <0.1 | present | 97.8 | ○ |
| Comparative Example 3 | 30 | 0.5 | absent | 97.0 | ○ |
| Reference Example 1 | 20 | 0 | — | — | x |
| Reference Example 2 | 20 | 0 | — | — | x |

Footnotes;
○: small man-hour for assembling,
x: not small man-hour for assembling

INDUSTRIAL APPLICABILITY

The housing structure for a lighting device of the present invention has such a structure that a reflecting plate for reflecting light from light sources arranged therein in a specific direction is integrated with light sources, support portions composed of optical sheets or the like, and fixing portions by using a polycarbonate-based resin composition containing titanium oxide and serves as a chassis itself, and a storage portion for a drive substrate can be formed in the upper end thereof, and thus it can be used in a backlight device as a housing structure for a lighting device which is light in weight and has a small number of assembly steps.

Further, light sources such as cold-cathode tubes are incorporated into the housing structure of the present invention, a backlight device including a light diffusing plate and required optical films and a liquid crystal unit including a liquid crystal panel and required optical sheets are assembled together, and the periphery of the assembly is surrounded by peripheral frame members and reinforcing frames, and thus a robust liquid crystal display member can be provided in a small number of assembly steps.

Further, the method of manufacturing the housing structure for a lighting device of the present invention includes molding a polycarbonate-based resin composition containing 20 to 60% by mass of titanium oxide having excellent reflection performance into a sheet and vacuum forming or pressing the sheet. Therefore, contrary to the related art, this method can be used as a method of manufacturing a housing structure for a lighting device such as a backlight which does not require insert molding with a metal chassis and the installation of other members such as a lamp holder and a lamp support which is lightweight and has a small number of assembly step.

The invention claimed is:

1. A housing structure for a lighting device, comprising a box-like molded product having a thickness of 1.5 to 3.5 mm obtained from a polycarbonate-based resin composition containing 20 to 60% by mass of titanium oxide, wherein an inner side portion of the molded product has a fixing portion of a terminal of light source integrally formed thereon.

2. A housing structure for a lighting device according to claim 1, further comprising light source support portion integrally formed on an inner bottom portion of the molded product.

3. A housing structure for a lighting device according to claim 1, further comprising a rib structure on an upper portion of the box-like molded product.

4. A housing structure for a lighting device according to claim 1, further comprising a rib structure or a projection portion according to optical design on a bottom portion of the box-like molded product.

5. A housing structure for a lighting device according to claim 1, further comprising a light diffusing plate support portion formed integrally on an inner bottom portion of the molded product.

6. A housing structure for a lighting device according to claim 5, wherein the light diffusing plate support portion integrally formed on the inner bottom portion of the molded product is formed on a fluorescent tube support portion or a projection portion according to optical design formed on the bottom portion.

7. A housing structure for a lighting device according to claim 1, further comprising a light shielding layer on an exterior surface of the box-like molded product.

8. A housing structure for a lighting device according to claim 1, further comprising a light resistant coating layer on an interior surface of the box-like molded product.

9. A housing structure for a lighting device according to claim 1, further comprising a light reflection film bonded to the interior surface of the box-like molded product.

10. A housing structure for a lighting device according to claim 1, wherein an inner bottom portion of the box-like molded product has a reflectance (Y value) for reflected light of 95% or higher and a total light transmittance of 1% or lower.

11. A housing structure for a lighting device according to claim 1, further comprising a tap hole for attaching other parts formed in a rear surface or front surface of the housing.

12. A housing structure for a lighting device according to claim 1, further comprising a recessed storage portion for storing a drive substrate integrally formed in any one of box-like upper end portions.

13. A backlight device manufactured by incorporating a linear or point light source in the housing structure for the lighting device according to claim 1, placing a light diffusing plate above the light source, and further laminating optical films.

14. A liquid crystal display member, which is manufactured by: incorporating the linear or point light source in the housing structure for the lighting device according to claim 1; placing a light diffusing plate, an optical film, and a liquid crystal panel above the linear or point light source in that stated order; and attaching a peripheral frame member to a periphery thereof.

15. A liquid crystal display member according to claim 14, further comprising a reinforcing frame attached to the peripheral frame member on a backside of the liquid crystal display member.

16. A liquid crystal display member, wherein the liquid crystal display member according to claim 15 has the peripheral frame member and/or the reinforcing frame made of a metal.

17. A method of manufacturing a housing structure for a lighting device, comprising the steps of:

forming a polycarbonate-based resin composition containing 20 to 60% by mass of titanium oxide into a sheet; and vacuum forming or pressing the sheet to manufacture a box-like molded product having a thickness of 1.5 to 3.5 mm in which a portion for fixing a terminal of a light source is integrally formed on an inner side portion.

* * * * *